United States Patent
Varcus et al.

(10) Patent No.: US 6,361,067 B1
(45) Date of Patent: Mar. 26, 2002

(54) AIRBAG WITH INTERIOR DEFLECTION DEVICE

(75) Inventors: Johannes-Alexander Varcus, Sprockhoevel; Hans Gert Nilson, Wuppertal; Bernd Uwe Zimmerbeutel, Remscheid, all of (DE); James Kent Conlee, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/464,622

(22) Filed: Dec. 16, 1999

(30) Foreign Application Priority Data

Dec. 18, 1998 (DE) .......................... 198 58 690

(51) Int. Cl.⁷ ................................. B60R 21/24
(52) U.S. Cl. ........................... 280/729; 280/740
(58) Field of Search ................. 280/729, 740, 280/743.1

(56) References Cited

U.S. PATENT DOCUMENTS

| 5,172,933 A | * | 12/1992 | Strasser | ...................... 280/740 |
|---|---|---|---|---|
| 5,249,824 A | * | 10/1993 | Swann et al. | ................. 280/729 |
| 5,447,330 A | * | 9/1995 | Tagawa et al. | ........... 280/743.1 |
| 5,573,270 A | | 11/1996 | Sogi et al. | |
| 5,899,493 A | * | 5/1999 | Berger | ....................... 280/743.1 |
| 5,913,535 A | * | 6/1999 | Taguchi et al. | .............. 280/729 |

FOREIGN PATENT DOCUMENTS

| DE | 4121659 | | 1/1993 | |
|---|---|---|---|---|
| DE | 9211421 | | 3/1993 | |
| DE | 4442118 | | 6/1995 | |
| EP | 0422840 | | 2/1995 | |
| GB | 2265118 | * | 9/1993 | ................. 280/729 |
| JP | 1-311930 | * | 12/1989 | ................. 280/729 |
| JP | 3-281460 | * | 12/1991 | ................. 280/729 |
| JP | H10-71920 | | 3/1998 | |
| JP | H10-166978 | | 6/1998 | |
| JP | H10-226294 | | 8/1998 | |

* cited by examiner

Primary Examiner—Peter C. English
(74) Attorney, Agent, or Firm—Kathryn A. Marra

(57) ABSTRACT

An airbag which is provided with an airbag mouth (16) for connection to a gas generator has in the interior of the airbag a deflection device (18) in the region of the airbag mouth (16) which at least partly laterally deflects a gas flow which emerges from the airbag mouth (16).

6 Claims, 1 Drawing Sheet

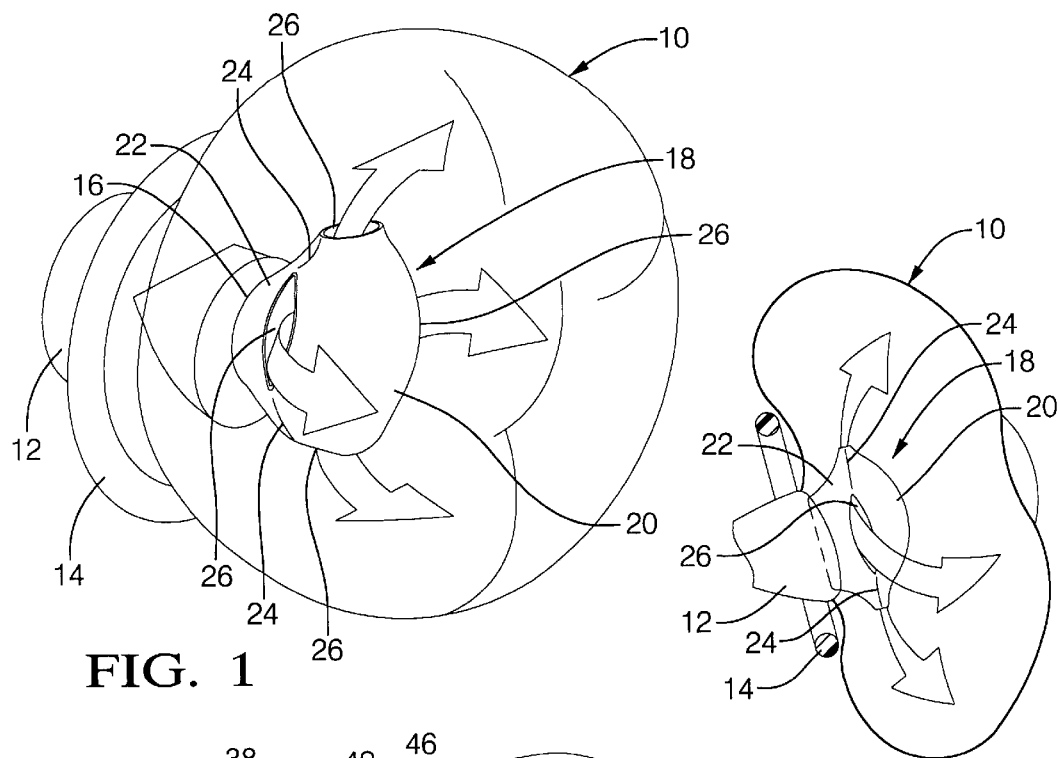
FIG. 1
FIG. 1 A
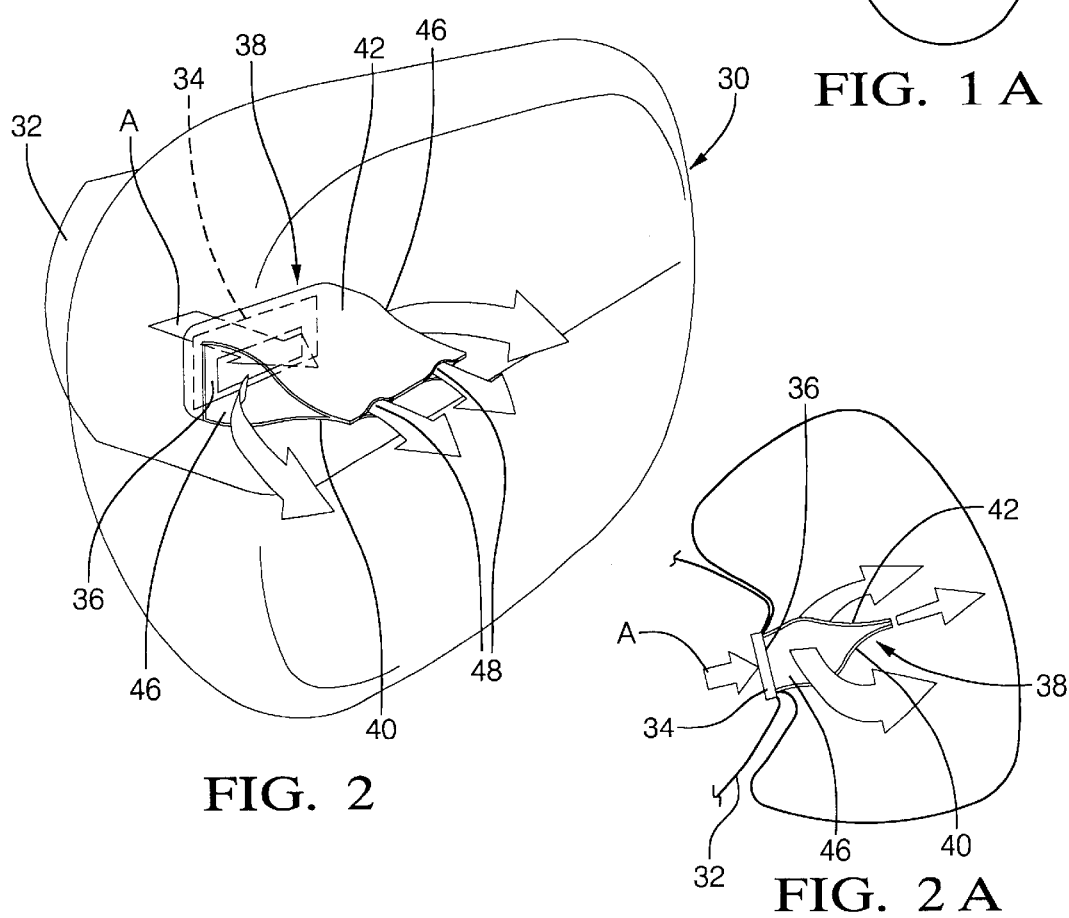
FIG. 2
FIG. 2 A

AIRBAG WITH INTERIOR DEFLECTION DEVICE

TECHNICAL FIELD

The present invention relates to an airbag which is provided with an airbag mouth for connection to a gas generator.

BACKGROUND OF THE INVENTION

An airbag of this kind is known in principle and serves for the protection of vehicle passengers in an accident. On the ignition of the gas generator the gas flows through the airbag mouth into the airbag interior so that the latter unfolds and forms a cushion for the vehicle passenger. In some circumstances, it is desired that the airbag does not unfold primarily in the direction towards the vehicle passenger but rather laterally or radially respectively as far as possible.

SUMMARY OF THE INVENTION

The object of the present invention is to provide an airbag that unfolds largely radially.

This alternative and advantage is accomplished by providing a deflection device in the interior of the airbag in the region of the airbag mouth which at least partly laterally deflects a gas flow which emerges from the airbag mouth. Through this it is achieved that the gas flow which enters the airbag is not guided directly in the direction of the vehicle passenger. Rather, a diversion or a deflection of the gas flow takes place in a direction which extends transversely to the initial inflow direction of the gas flow into the airbag mouth. Through this it is achieved that the airbag first unfolds substantially laterally or radially respectively so that gas which flows in afterwards does not excessively deform the airbag envelope in the direction of the vehicle passenger.

In accordance with one embodiment, the deflection device preferably can have multiple lateral outlet openings and at least one forward outlet opening, with the forward outlet opening preferably having a smaller cross-section that one of the lateral outlet openings. In this embodiment the gas flow, which comes from the gas generator, is partly laterally deflected, which effects the action in accordance with the invention to a significant extent. Alternatively, the deflection device can have a plurality of lateral outlet openings and no forward outlet opening. An embodiment of this kind is preferable for example in drivers' airbags in which the distance between the occupant and the unfolding airbag is particularly typically less than the passenger's side.

A particularly preferred embodiment results when a heat shield is provided in the interior of the airbag and in the region of the airbag mouth, forms a part of the deflection device. In this embodiment the effect in accordance with the invention can be achieved in a particularly simple and also economical manner. For example a cloth part can be attached to the heat shield, which can likewise be formed as a cloth part, with lateral outlet openings being provided between the two cloth parts. The two cloth parts can for example be sewn together along their outer periphery, with corresponding lateral or forward outlet openings being formed between the two cloth parts.

A further advantageous embodiment consists in that a further (smaller) airbag is provided as a deflection device which is arranged inside the first airbag and is provided with lateral gas outlet openings. In this embodiment the gas which is produced by the gas generator is first admitted into the first airbag, is laterally deflected in the latter and then flows into the actual airbag.

BRIEF DESCRIPTION OF THE DRAWINGS

The present invention will now be described, by way of example, with reference to the accompanying drawings, in which:

FIGS. 1 and 1A are schematic illustrations of an airbag in a perspective view and in a side view; and FIGS. 2 and 2A are views which correspond to those of FIG. 1 and FIG. 1A and which relate to the alternative embodiment of the invention.

DESCRIPTION OF THE PREFERRED EMBODIMENT

FIG. 1 shows a driver's airbag 10 which is accommodated in a steering wheel 14 which is mounted at a steering column 12. The airbag 10 is accommodated in the folded state in an airbag module which has a housing and a gas generator (not illustrated in the figures).

The airbag 10 illustrated in FIG. 1 has a substantially cylindrically shaped outer contour, with an airbag mouth 16, through which the gas which is produced by the gas generator flows in into the airbag interior, being formed in an end surface of the cylinder.

In the interior of the airbag 10 in the region of the airbag mouth 16, a deflection device 18 is provided that laterally deflects the gas flow that emerges from the airbag mouth 16. In other words, the gas that emerges from the airbag mouth 16 cannot flow directly in the direction of the front end surface of the airbag. Rather, the gas flow is first laterally diverted or deflected, which is indicated by corresponding arrows.

In this embodiment, the deflection device 18 is formed by a cloth part 20 being sewn onto a heat shield 22 which is likewise formed as a cloth part and which circularly surrounds the airbag mouth 16. In a plan view, the heat shield 22 is designed substantially circularly, with a circular passage opening being formed centrally in the middle for the gas flow. The cloth part 20 is likewise designed to be substantially circular in a plan view, with the cloth part 20 and the heat shield 22 being connected together by seams 24 in such a manner that lateral outlet openings 26 remain free between the cloth part 20 and the heat shield 22.

FIG. 2 shows a further embodiment of an airbag in accordance with the invention which is designed as a front seat passenger's airbag. The airbag 30, which is illustrated in FIG. 2, is ,for example, arranged in the region of a dashboard 32 in an airbag module which has a housing and a gas generator (in each case not illustrated). The front end side of the housing is indicated in FIG. 2 and is provided with the reference symbol 34.

The airbag 30 which is illustrated in FIG. 2 has an outer contour which has substantially the shape of a rectangular parallelepiped in the inflated state, with the airbag mouth 36, through which the gas which is produced by the gas generator can flow into the interior of the airbag, being formed at the rear side of the airbag.

In the interior of the airbag 30, a deflection device 38 is provided. The deflection device 38 at least partly laterally deflects the gas flow that emerges from the airbag mouth 36. As is indicated by arrows, the predominant part of the gas flow is laterally deflected, i.e. is deflected into a direction which extends transverse to the outflow direction, which is indicated by an arrow A, of the gases which are produced by the gas generator.

In this exemplary embodiment, the deflection device 38 is formed in that two cloth parts 40 and 42, which normally serve as a heat shield, are sewn together at a total of three locations. The cloth parts 40 and 42 have in a plan view a substantially rectangular shape and are in each case connected at a longitudinal edge to the upper and to the lower edge respectively of the front side 34 of the housing (not illustrated). At their free longitudinal edges, the two cloth parts 40 and 42 are sewn together, with a seam being provided at each of the free corners and a further seam being provided in the middle of the free longitudinal edge.

Forward outlet openings 48 are formed in each case between these seams. Lateral outlet openings 46 develop laterally between the cloth parts 40 and 42. As FIG. 2 shows, each forward outlet opening 48 has a smaller cross-section than one of the lateral outlet openings 46.

As FIGS. 1 and 2 show, the direction of the gas flow is laterally or radial deflected respectively when the gas flow emerges from the gas generator so that the gas flow does not flow in the direction of the vehicle passenger but rather transversely thereto. Through this the gas bag is first predominantly transversely unfolded to help reduce the possibility of injury from airbag unfolding.

It should be pointed out supplementarily that the two cloth parts can either be sewn, welded, or in some other manner fastened to one another. It is also possible to form these latter in a single piece.

The invention is described with regard to the particular embodiments shown herein, but is not intended to be limited thereby, and should be interpreted broadly within the scope and spirit of the claims.

What is claimed is:

1. An airbag comprising:

an airbag mouth adapted for acceptance of inflation gas from a gas generator and disposed in fluid communication with an inflatable body, the airbag having an interior, and a deflection device located in the airbag interior in the region of the airbag mouth, the deflection device including a plurality of lateral outlet openings for channeling in a lateral flow pattern at least a portion of a gas flow which emerges from the air bag mouth, the deflection device further including two cloth parts having edges in substantially opposing relation to the airbag mouth that are interconnected by seams, and at least one outlet opening formed between the seams for directing a portion of said gas flow away from the airbag mouth in a direction substantially normal to the airbag mouth, such that the inflatable body expands in inflated relation outwardly away from the deflection device in both depth and lateral dimensions as the gas flow emerges from the airbag mouth.

2. The airbag in accordance with claim 1, wherein the airbag includes a heat shield on the airbag interior, and wherein at least a portion of the deflection device is provided by the heat shield.

3. The airbag in accordance with claim 1, wherein a heat shield is provided in the interior of the airbag and in the region of the airbag mouth and consists of the two cloth parts of the deflection device, the cloth parts being connected to form at least a portion of said plurality of lateral outlet openings.

4. The airbag in accordance with claim 1, wherein the two cloth parts at least partly surround the airbag mouth.

5. The airbag in accordance with claim 1, wherein said at least one outlet opening formed between the seams has a smaller cross-section than at least one of said plurality of lateral outlet openings.

6. The airbag in accordance with claim 1, wherein the deflection device includes a plurality of outlet openings formed between the seams for directing inflation gas away from the airbag mouth in a direction substantially normal to the airbag mouth.

* * * * *